(12) United States Patent
Ngo et al.

(10) Patent No.: US 9,914,362 B2
(45) Date of Patent: Mar. 13, 2018

(54) ENERGY STORAGE FOR POWER FACTOR CORRECTION IN BATTERY CHARGER FOR ELECTRIC-POWERED VEHICLES

(71) Applicant: Virginia Tech Intellectual Properties, Inc., Blacksburg, VA (US)

(72) Inventors: Khai Doan The Ngo, Blacksburg, VA (US); Hui Wang, Shandong (CN)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 820 days.

(21) Appl. No.: 14/139,059

(22) Filed: Dec. 23, 2013

(65) Prior Publication Data
US 2014/0306663 A1 Oct. 16, 2014

Related U.S. Application Data

(60) Provisional application No. 61/811,848, filed on Apr. 15, 2013.

(51) Int. Cl.
| | |
|---|---|
| *H02J 7/00* | (2006.01) |
| *G05F 1/70* | (2006.01) |
| *H02P 23/00* | (2016.01) |
| *H02P 25/00* | (2006.01) |
| *H02P 27/00* | (2006.01) |

(Continued)

(52) U.S. Cl.
CPC ....... *B60L 11/1803* (2013.01); *B60L 11/1812* (2013.01); *H02M 1/14* (2013.01); *H02M 1/4225* (2013.01); *B60L 2210/14* (2013.01); *B60L 2220/54* (2013.01); *B60L 2240/526* (2013.01); *B60L 2240/527* (2013.01); *B60L 2240/529* (2013.01); *H02M 7/5387* (2013.01); *Y02T 10/641* (2013.01); *Y02T 10/7005* (2013.01); *Y02T 10/7072* (2013.01); *Y02T 10/7225* (2013.01); *Y02T 90/127* (2013.01); *Y02T 90/14* (2013.01)

(58) Field of Classification Search
CPC .............. B60L 11/1811; B60L 11/1812; B60L 11/1814; B60L 11/1803; H02M 1/14; H02M 1/4225
USPC .......................................... 320/109; 318/438
See application file for complete search history.

(56) References Cited

U.S. PATENT DOCUMENTS

| | | | | |
|---|---|---|---|---|
| 4,626,750 A | * | 12/1986 | Post .................... | B60L 11/1805 318/139 |
| 5,872,489 A | * | 2/1999 | Chang ................. | H01L 27/0611 257/531 |

(Continued)

*Primary Examiner* — David V Henze-Gongola
(74) *Attorney, Agent, or Firm* — Whitham, Curtis & Cook, P.C.

(57) ABSTRACT

Switches of a switching circuit used to control operation of an electric motor such as in an electrically powered vehicle connect respective windings of the electric motor as a single phase inductor during battery charging. The inductor can then store inherent low frequency, second order ripple power and return that power to a load presented by a battery during battery charging to deliver substantially constant current. Storage of ripple power in the inductor allows the capacitance value, size, weight and cost of a filter capacitor of a power factor correction circuit providing input power to a battery charger to be reduced by an order of magnitude or more. Direction of current flow through the inductor is periodically reversed to avoid magnetizing the motor.

16 Claims, 6 Drawing Sheets

(51) Int. Cl.
  *B60L 11/18* (2006.01)
  *H02M 1/14* (2006.01)
  *H02M 1/42* (2007.01)
  *H02M 7/5387* (2007.01)

(56) References Cited

U.S. PATENT DOCUMENTS

| | | | | |
|---|---|---|---|---|
| 5,952,812 A | * | 9/1999 | Maeda | B60L 11/1811 |
| | | | | 318/803 |
| 7,898,828 B2 | * | 3/2011 | Maasland | B60L 11/1811 |
| | | | | 363/125 |
| 2012/0176084 A1 | * | 7/2012 | Klaes | B60L 11/803 |
| | | | | 320/107 |

\* cited by examiner

US 9,914,362 B2

ENERGY STORAGE FOR POWER FACTOR CORRECTION IN BATTERY CHARGER FOR ELECTRIC-POWERED VEHICLES

CROSS-REFERENCE TO RELATED APPLICATIONS

This application claims benefit of priority of U.S. Provisional Application 61/811,848, filed Apr. 15, 2013, which is hereby incorporated by reference in its entirety.

FIELD OF THE INVENTION

The present invention generally relates to power factor correction (PFC) circuits and, more particularly, to PFC circuits for battery chargers, especially battery chargers for electric-powered vehicles (EVs).

BACKGROUND OF THE INVENTION

To improve efficiency and reduce environmental pollution in urban areas, vehicles powered by electricity have been made commercially available and are increasing in popularity. Efficiency of electric powered vehicles such as automobiles, trucks, and railroad vehicles is improved over fossil fuel-powered vehicles since no power is consumed when the vehicle is not in motion and some of the power consumed during acceleration or hill-climbing can be recovered by using the electric motor of the vehicle as a generator during braking and coasting even though the weight of batteries and electrical controls for the motor is a significant contribution to the overall weight of the vehicle.

For that reason and to avoid the additional weight of strengthening structure to support very large batteries, battery power storage capacity and, consequently, the range of the vehicle is compromised and there is a need to frequently re-charge the batteries in electric-powered vehicles. When re-charging is performed, electrical power is generally provided from the so-called power distribution grid or a generator operating from so-called renewable resources such as solar panel and wind farms that also supply power with alternating current (AC), for efficiency of transmission, to other loads. Therefore, battery chargers and many other devices are required to include power factor correction (PFC) circuits and filters in order to avoid reflecting noise back to the power source or distribution system and devices connected to it.

A PFC circuit seeks to control transfer of power from an AC source such that the current drawn by a load is aligned in phase with the AC voltage for efficiency of power transfer. This is usually accomplished for loads operating on direct current (DC) power by rectifying the AC input voltage and using a converter including one or more pulse width modulated switches or other switching control arrangement to regulate the current drawn from the source to match the phase of the input voltage. A boost converter is usually the converter topology of choice for charging batteries for electric-powered vehicles since the DC voltage required is substantially higher than the peak of the AC voltage available.

Boost converters operate by switching power from a rectifier connected to a power source through an inductor such that the volt-second balance of the voltage developed across the inductor increases the peak voltage at the inductor output. This periodic high voltage must then be filtered because the product of sinusoidal voltage and current variation inherently produces a large low frequency, second-order (e.g. second harmonic of the AC frequency) power ripple which has required a very large-valued filter capacitor to achieve adequate regulation since a fluctuating voltage is not efficient for charging of batteries and may, over time, compromise the power storage capacity of the batteries. Therefore, a large filter capacitor has generally been required to store the power in the low frequency ripple.

The entire battery charging apparatus must be designed for a particular vehicle or vehicle model since electric powered vehicles have different power requirements, different power storage capacities and operate at different voltages but must be capable of receiving power from a standardized power source such as the power distribution grid. Therefore, a filter capacitor capable of storing the power in the power ripple during battery charging must be of significant volume and weight and must be carried in the vehicle. Thus, the size and weight of the filter capacitor (sometimes referred to as a DC-bus capacitor) may compromise operation of the vehicle by occupying space, reducing vehicle payload space, and causing consumption of some level of power (e.g. to accelerate its weight) but is not involved in actual operation of the vehicle but only used during battery charging while the vehicle is stationary.

SUMMARY OF THE INVENTION

It is therefore an object of the present invention to provide a power factor correction (PFC) converter circuit arrangement, particularly for charging of electric-powered vehicles and other devices controlling or including DC motors, that allows substantial reduction of the size and weight of the filter capacitor in the PFC circuit.

It is another object of the invention to allow reduction of filter capacitor size, weight and required capacitance value by storage of ripple power in an inductor.

In order to accomplish these and other objects of the invention, a method of supplying power to a device including an inductor is provided comprising steps of supplying power to a power factor correction circuit, connecting an output of the power factor correction circuit to a power converter, connecting an output of the power converter to a load, and storing ripple power of the output of the power factor correction circuit in the inductor of the device.

In accordance with another aspect of the invention, a controller is provided for controlling a switching circuit for supplying power to at least one winding of an electric motor to control the motor, the controller providing signals to respective switches of the switching circuit such that the at least one winding of the electric motor is connected as a single phase inductor and current through the at least one winding is periodically reversed.

In accordance with a further aspect of the invention, an electrically powered vehicle is provided including an electric motor, a battery, a battery charger and a switching circuit for controlling connection of at least one winding of the motor to the battery for normal operation of the electrically powered vehicle wherein the battery charger includes a controller for generating signals to control the switching circuit such that the at least one winding is connected to the battery charger as an inductor for storing ripple power appearing at an output of a power factor correction circuit and periodically reversing a direction of current flow in the inductor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
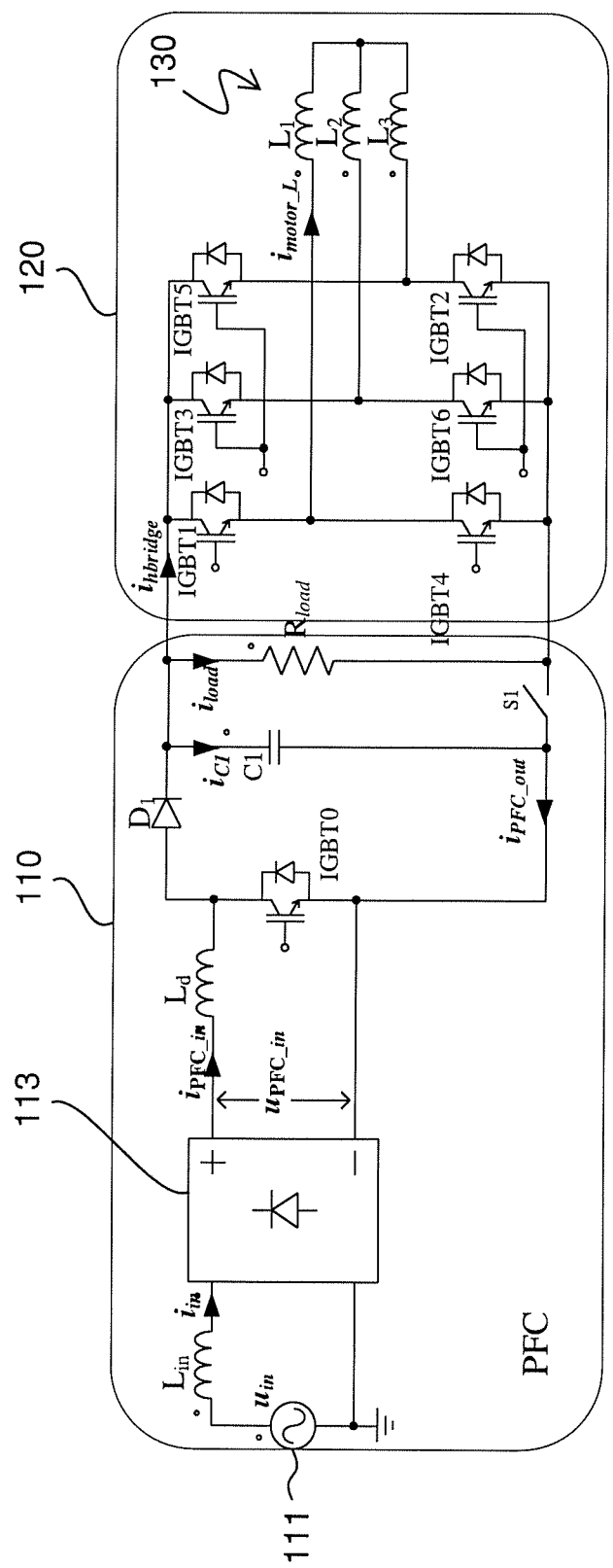
FIG. 1 is a schematic diagram of a preferred topology for a battery charger and DC motor such as may be provided in an electric powered vehicle and a power factor correction (PFC) circuit in accordance with the invention.

Referring now to the drawings, and more particularly to FIG. 1, there is shown a schematic diagram of a preferred embodiment of the invention. The schematic diagram, as illustrated, comprises three distinct sections: power factor correction (PFC) circuit 110, a motor controller switching section 120 and a motor/generator 130. The motor/generator (hereinafter referred to simply as a motor) is depicted as a three-phase motor with Y-connected windings as is typical of motors used in land-based electric vehicles such as automobiles but it is to be understood that, since the invention connects the motor windings as a single phase inductor for power storage during battery charging, the invention may be practiced with electric motors of other numbers of phases (including single-phase), delta connected winding motors as well as other types of electric motors (e.g. linear motors and DC motors such as may be found in other electric powered vehicles such as railroad vehicles, boats and aircraft; all of which are intended to be comprehended by the term "vehicle").

In the following discussion, it should be understood that switch S1 depicted in FIG. 1 is not necessary to the practice of the invention and would not ordinarily be provided in an electric vehicle of other device to which the invention could be applied. However, it is illustrated to facilitate an understanding of the invention and its application to, for example, electric vehicles. However, switch S1 was provided in the simulations of the operation of the invention as will be described below to obtain the voltage and current waveforms both with and without the storage of power in motor windings connected as an inductor.

The motor controller 120 comprises an array of switches that is generally present in electric vehicles (although the switch configuration may be varied) to control energization of rotor windings of electric motor 130 so that its direction and speed of rotation can be controlled during normal operation of the electric vehicle when switch S1 is open and the switches IGBT1-IGBT6 connect the windings to the battery/power bus through another circuit (not shown).

When battery charging is performed, the connection for normal operation is opened, the vehicle is stationary, and switch S1 is closed. However, it is very important to an understanding and appreciation of the invention to observe that the switches IGBT1-IGBT6 serve to connect the respective motor windings to the DC-bus through a bridge circuit and can be controlled to establish current in pairs of windings or all windings simultaneously to form a single-phase H-bridge that connects the windings to form a single phase inductor and that either type of connection can be made while providing independent control of current direction in each individual motor winding.

That is, to operate the motor to, for example, propel an electric vehicle, pairs of windings (or all windings to reduce angular vibration) would be energized in a sequence to cause the rotor of the motor to rotate. However, for a three-phase motor, for example, the H-bridge circuits can also be controlled to connect any two windings in parallel with each other and the remaining winding in series with the parallel-connected pair of windings. In such an electrical connection or configuration, the motor electrically become a large-valued inductor capable of carrying large current. For example, if the power rating of a permanent three-phase magnet synchronous motor is 80 KW, the inductance of a single phase of the motor is about 0.1-0.3 mH and capable of carrying current equal to the currents drawn by the motor during normal operation. It should also be noted that when the windings are connected in such a parallel-series arrangement, no net rotational force will be developed in the rotor, regardless of whether the windings are formed on the rotor or stator of the three-phase motor.

As alluded to above, the PFC circuit 110 is shown in a form suitable for receiving input power from an AC source 111 which has an output (e.g. as seen by the PFC looking into the power source or grid) equivalent series inductance $L_{in}$. The AC input voltage $u_{in}$ is rectified by a rectifier circuit 113 which may be of any design. The boost converter topology comprises a switch such as IGBT0 which draws current through inductor, $L_d$, when conductive, and develops a voltage across the inductor that opposes the increase in current through the inductor, $L_d$, thus storing energy in that inductor. When IGBT0 becomes non-conductive, the current decreases and the voltage on the inductor caused by the decreasing current at the increased voltage releases the energy/power stored in inductor $L_d$ while IGBT0 was conductive which is then stored in filter/DC-bus capacitor C1. Reverse flow of current when IGBT0 is conductive is prevented by diode D1. Thus, a current at an increased voltage can be delivered to a load, depicted as a resistance $R_{load}$ for generality. In the case of an electric-powered vehicle or other battery powered device, the load is a battery to be charged.

IGBT0 is driven in a manner (preferably using pulse width modulation (PWM)) that aligns the phase of current $i_{PFC}$ with the phase of voltage $u_{in}$. However, as alluded to above, a low frequency, second order (e.g. second harmonic of the input AC voltage) power ripple is caused by the source and cannot be eliminated or converted by the PFC circuit. Therefore, the second order ripple must be filtered (e.g. the ripple power stored in capacitor C1) to avoid affecting the load. If the value of capacitor C1 is small and the ripple power insufficiently stored or filtered, the power ripple appears as distortion of the amplitude of the product of $i_{in}$ and $v_{in}$ and the envelope of pulses of $i_{PFC}$ differ from a rectified sinusoidal shape as shown, for example, to the left of the vertical dashed line of FIG. 5 (the dashed line corresponding to the time of closing of switch S1, causing storage of ripple power in the motor windings/inductor). The magnitude of this distortion is, of course, affected by the value of DC-bus/filter capacitor C1 and a capacitor of substantial size and weight has generally been required to adequately limit such distortion, as noted above. That is, it is assumed in FIG. 5 that C1 is smaller than that required to adequately filter or store the energy of the power ripple and the distortion would be reduced if C1 were to be of larger value. Conversely, the magnitude of the distortion would be increased if the value of C1 is decreased in the absence of the invention (e.g. when switch S1 is open, preventing ripple power storage in the motor windings/inductor).

In accordance with the invention, since the motor windings can be connected to function as a single phase inductor, as discussed above, that inductor (or any other inductor that can be electrically developed from structure already provided in a given device) can be used to store power such as the low frequency ripple power alluded to above to reduce the amount of power that must be stored in capacitor C1. A switching circuit for controlling the motor during normal operation, preferably in the form of a multi-phase converter 120 which is already available in an electric-powered vehicle can be operated by a separate controller of low cost and small size and weight to not only form and, if desired, commutate the series-parallel connection (e.g. to change the windings that are connected in parallel and series, respectively) of the windings but can do so in a manner that periodically reverses the current flow in the windings to avoid a problem of magnetizing the motor by controlling IGBT1-IGBT6 in accordance with, for example, the waveforms illustrated in FIG. 1A. Alternatively and preferably, for simplicity, the series-parallel connection can be static by simply providing for common control (e.g. by connecting the control electrodes, as illustrated in FIG. 1) of two pairs of IGBTs as shown and only providing for periodic current reversal in the windings. The controller should be designed to meet the requirements of the application and particulars of the design for particular application requirements as will be evident to those skilled in the art since the control signals need only connect the windings of a particular motor design as a single phase inductor and reverse the current in each winding periodically.

Because the input voltage is expressed as $$u_{in}=U_{in} \sin \omega t$$

and the input current is expressed as $$i_{in}=I_{in} \sin \omega t$$

the input power is $$p_{in}=U_{in}I_{in}/2-U_{in}I_{in}/2 \cos 2\omega t$$

$$p_{in}=P_{o\omega t}=P_o+P_c+P_L.$$

If $$p_L=k \times U_{in}I_{in}/2 \cos 2\omega t$$

where $k \leq 1$, $K$ ($1 \geq K \geq 0$) is the energy storage margin coefficient (e.g. if K=1, the second order power is entirely stored in the inductor formed by motor windings) because $$p_L=\frac{1}{2}L(di_L/dt)^2.$$

Figure 2:
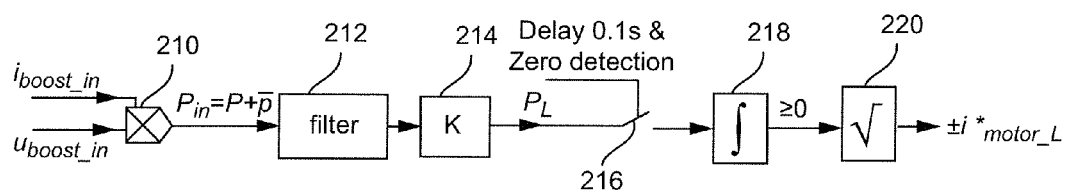
FIG. 2 is a block diagram of a model of a portion of the converter of FIG. 1 for calculating the command current for delivering ripple power to an inductor.

Therefore $$i_L=(const+k\times((U_{in}I_{in}/2)/2\omega L) \sin 2\omega t)^{1/2}$$

which can be schematically represented as illustrated in FIG. 2. Because the second order ripple power is inherently present, a filter is required. All filters exhibit a transient response, a delay of nominally 0.1 seconds is provided prior to integration which provides a positive result from which the square root may be extracted.

The key to using the motor windings as an inductor to store the ripple power is the calculation of the command current $i^*_{motor\_L}$ for the inductor. Referring now to FIG. 2 a block diagram of a model of a portion of FIG. 1 is shown. In the model of FIG. 2, the input power to the boost converter is monitored by multiplying the input voltage and input current at multiplier 210 which is then filtered at 212 and multiplied by a factor k, which may be adjustable. This result is preferably blocked for an initial period of time and at detected zero crossings, as represented by switch 216. When not blocked by switch 216, the result is integrated at 218 and the square root of the result of the integration is computed at 220. In terms of FIG. 2, if the input voltage is expressed as $$u_{boost\_in}=U_{in} \sin \omega t,$$

then the input power of the boost circuit is:

$$p_{in}=U_{in}I_{in}/2-(U_{in}I_{in}/2) \cos \omega t = P+\tilde{p}$$

(where P is the constant power and $\tilde{p}$ is the ripple power) because $$p_{in}=p_{out}=P_{load}+P_{C1}+p_L$$ where $p_{C1}$ is the power stored in capacitor C1 and $p_L$ is the power stored in the inductor formed by the series-parallel connection of the motor windings and the power flowing to the load, $P_{load}=P$ which is ideally constant.

Thus, for the second harmonic, the power of the power ripple can be expressed as $$p_L=k\tilde{p}=k(U_{in}I_{in}/2) \cos \omega t \text{ where } 0 \leq k \leq 1$$

where $\tilde{p}$ is the ripple power and k is the fraction of total power transferred to the load that is contained in the power ripple. Thus by choice of an appropriate value of K=k, which can be established by monitoring of any of a number of current waveforms such as those shown in FIGS. 5-7 as will be discussed in greater detail below, or calculated as described above, the power of the second order low frequency power ripple can be transferred to and stored in the inductor formed by the series-parallel connections of the motor windings (or other inductor that can be electrically formed from the existing structure of a device).

It should be further noted from the model of FIG. 2 that a switch is indicated to provide a delay that avoids the transient of the filter of the PFC circuit and to provide a very short "dead-time" at the zero crossings after which, indefinite integration starts from zero. This switch is preferably simulated by appropriate control of IGBT1-IGBT6 and a separate physical switch is not required but could be provided if desired. After the delay, integration of indefinite duration starts at the first zero-crossing of the wave $p_L$ and the integration result is used to calculate the command signal to produce the correct inductor current, $\pm i^*_{L\_motor}$. As alluded to above, the polarity of the inductor current is preferably reversed every half-cycle to avoid magnetization of the motor by appropriate control of IGBT1-IGBT6.

Figure 1A:
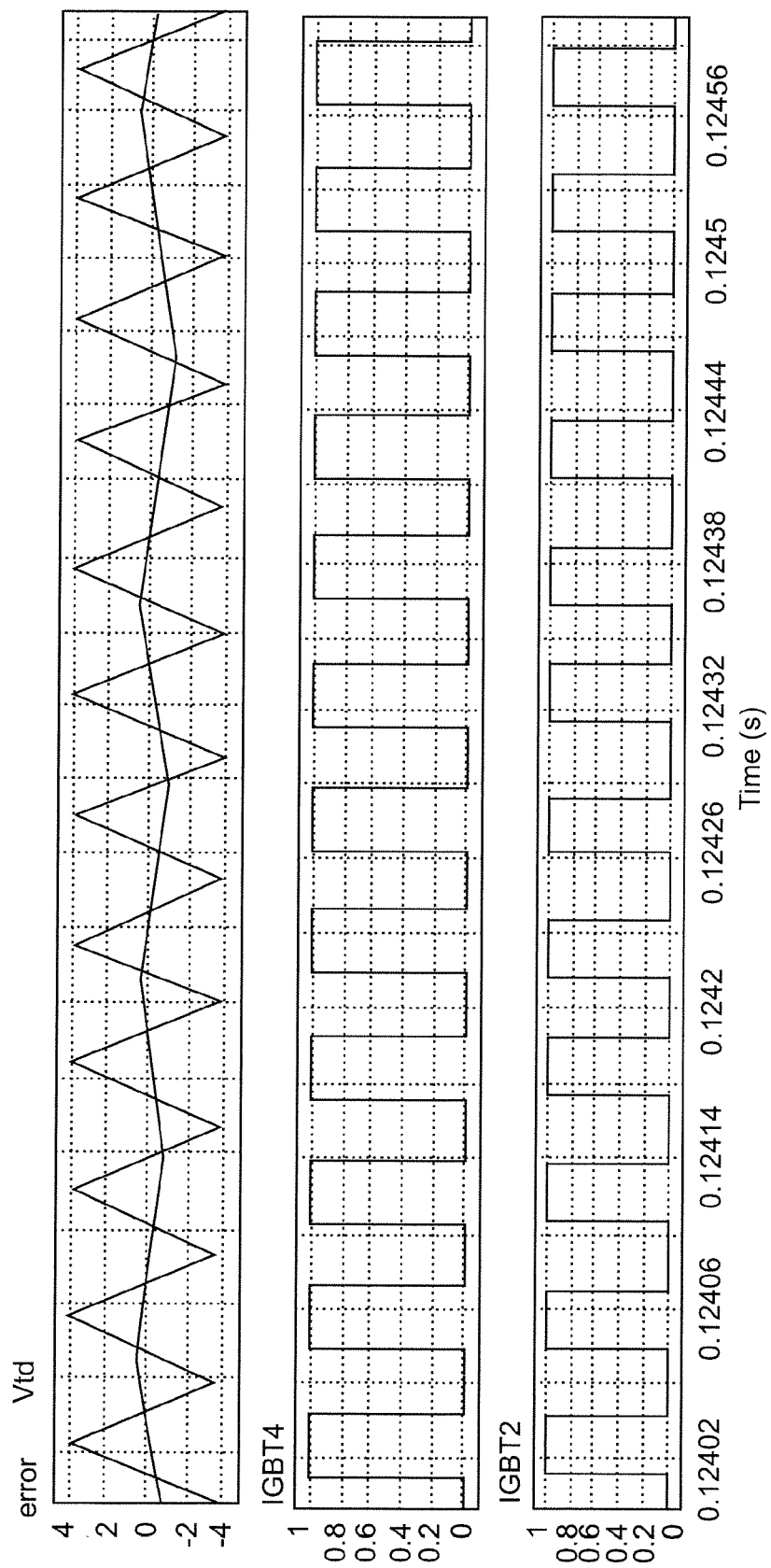
FIGS. 1A and 1B are an exemplary set of waveforms for control of a switching circuit for connection of motor windings as an inductor and to periodically reverse current through the windings.
Figure 1B:
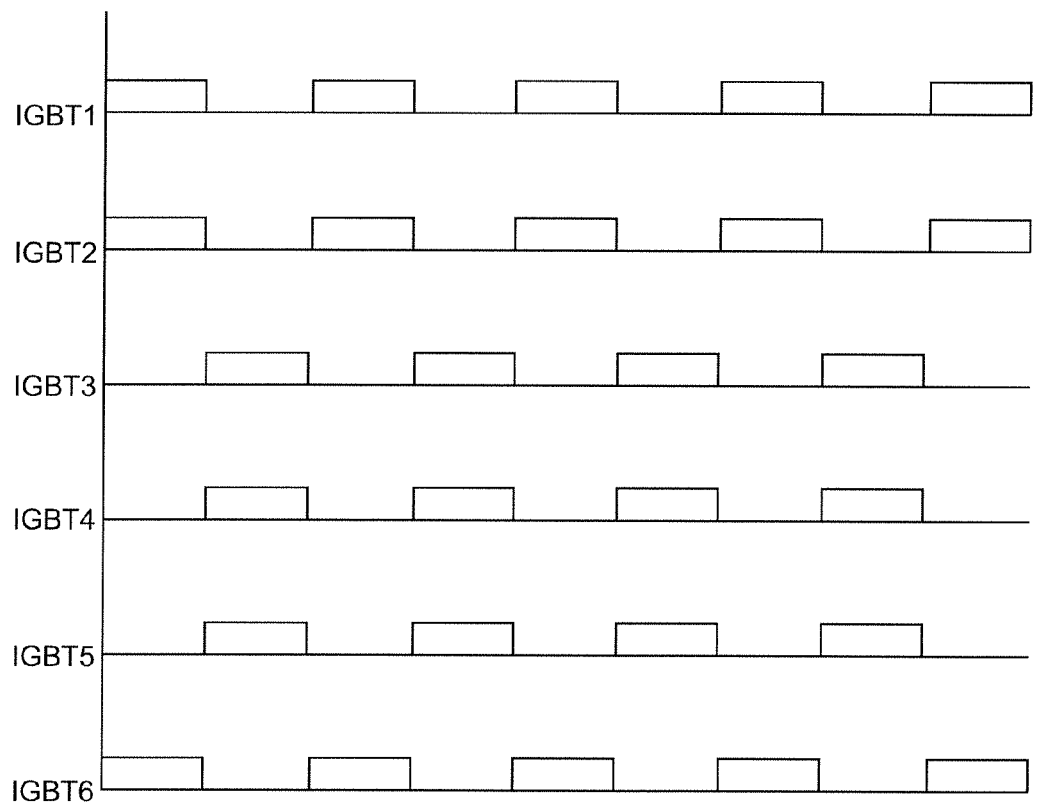
Figure 3:
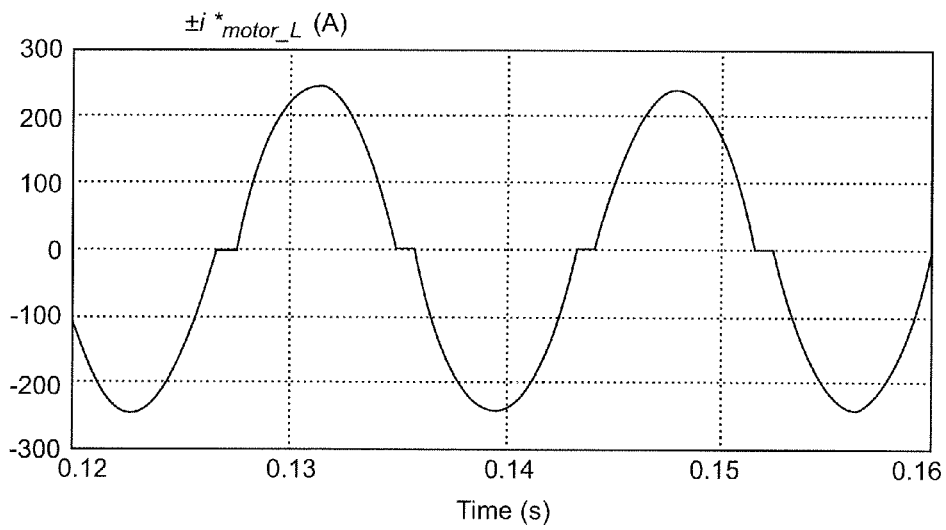
FIG. 3 illustrates the waveform of the command current for the inductor.

Many different sets of waveforms can be derived that provide different but time-contiguous series-parallel connections of motor windings to form a single phase inductor and provide for reversal of current each half-cycle to prevent motor magnetization. A set of collector current waveforms corresponding to the timing of control waveforms for IGBT2 and IGBT4 is shown in FIG. 1A for the converter connections shown in FIG. 1 with IGBT3/IGBT 5 and IGBT2/IGBT6 being controlled in common and where no commutation of windings is employed. That is, the collector waveform for IGBT1 is opposite to IGBT4 and the collector waveform for IGBT5 is opposite to IGBT2 while the collector waveform of IGBT6 is the same as for IGBT2 and the collector waveform of IGBT5 is the same as IGBT3. The timing of control waveforms is shown in FIG. 1B (the waveforms actually used for simulations that will be discussed below which omit the dead-time between half-cycles of the input current, resulting in harmonics in the waveform of the inductor current near zero). Controlling IGBT1, IGBT2 and IGBT6 alternatingly with IGBT3, IGBT4 and IGBT5 serves to reverse the direction of current through the motor windings every half-cycle. The upper graph of FIG. 1A shows the triangular waveform of $v_{in}$ and the error signal output by the controller having $i_{motor\_L} - i^*_{motor\_L}$, (as shown in FIGS. 1 and 2, respectively) as input. The resulting small variation of duty cycle in the collector waveforms is evident. The switching frequency for the simulation was 20 KHz but is not critical for successful practice of the invention. Many other waveform sequences having similar suitable characteristics for control of IGBT1-IGBT6 will be evident to those skilled in the art from the waveform sequences shown in FIGS. 1A and 1B (but including the dead-time illustrated in FIG. 3) which provide perhaps the simplest and thus most preferred control of the switches of converter 120.

Figure 4:
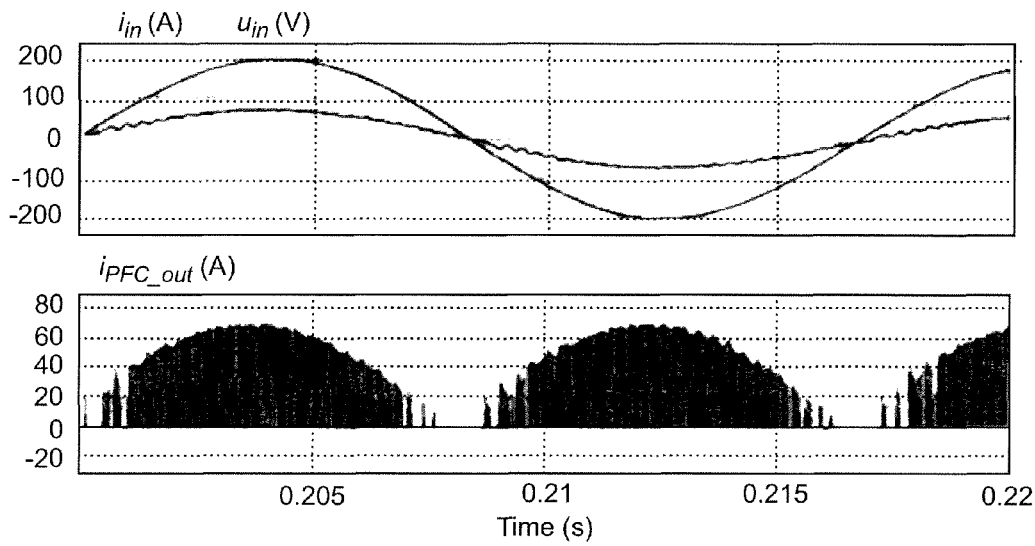
FIG. 4 illustrates waveforms of the PFC input current and voltage and output current

The resulting waveform of the command current is shown in the upper waveforms of FIG. 4 which shows the input current of the PFC circuit, is in phase with the input voltage $u_{in}$. The achievement of power factor correction is evident from the waveform $i_{PFC\_out}$ shown in the lower waveform of FIG. 4. The close approximation of sinusoidal shape is evident.

Figure 6:
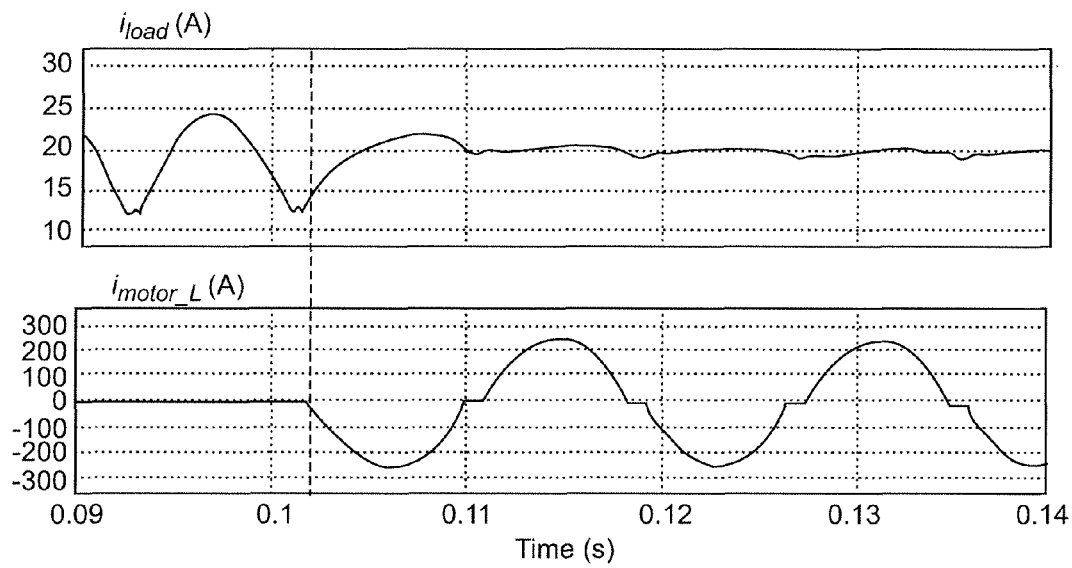
FIG. 6 illustrates waveforms of the inductor current before and after onset of power storage in an inductor.
Figure 7:
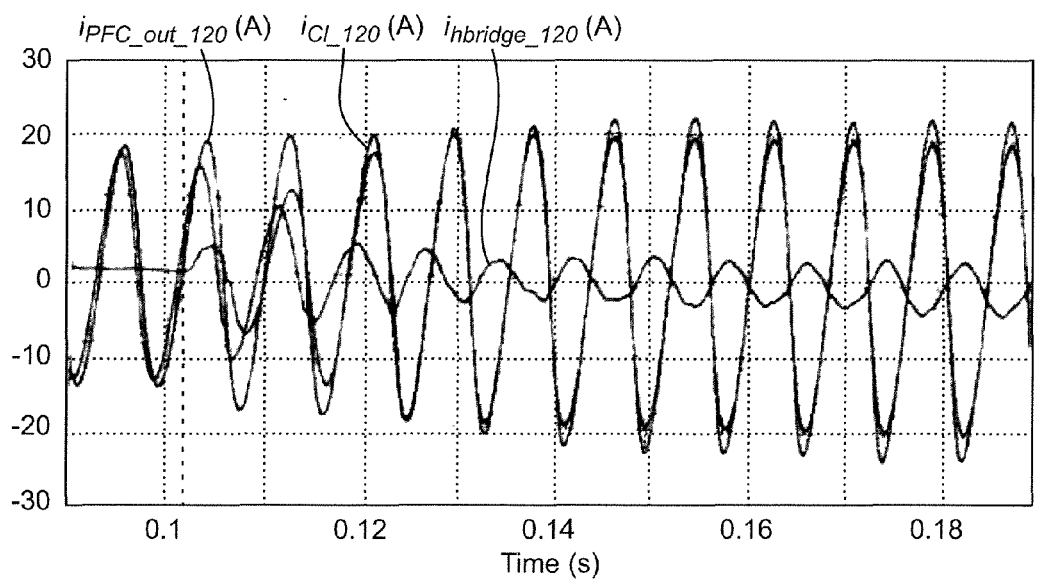
FIG. 7 illustrates waveforms for the second harmonics of PFC output current, H-bridge output current and capacitor current before and after onset of power storage in an inductor.

When the inductor current is controlled in this manner to store the power in the power ripple in the inductor, the input current of the PFC is in phase with the input voltage to the PFC. The current waveforms in respective parts of the circuit of FIG. 1 or the model of FIG. 2 are illustrated in FIGS. 5-7 which, for purposes of comparison, show the current before the onset of (e.g. without) power storage in the inductor (corresponding to S1 of FIG. 1 being open and the inductor disconnected) to the left of a vertical dashed line and after the onset of power storage in the inductor (including transient behavior) to the right of the dashed line (corresponding to switch S1 of FIG. 1 being closed).

Figure 5:
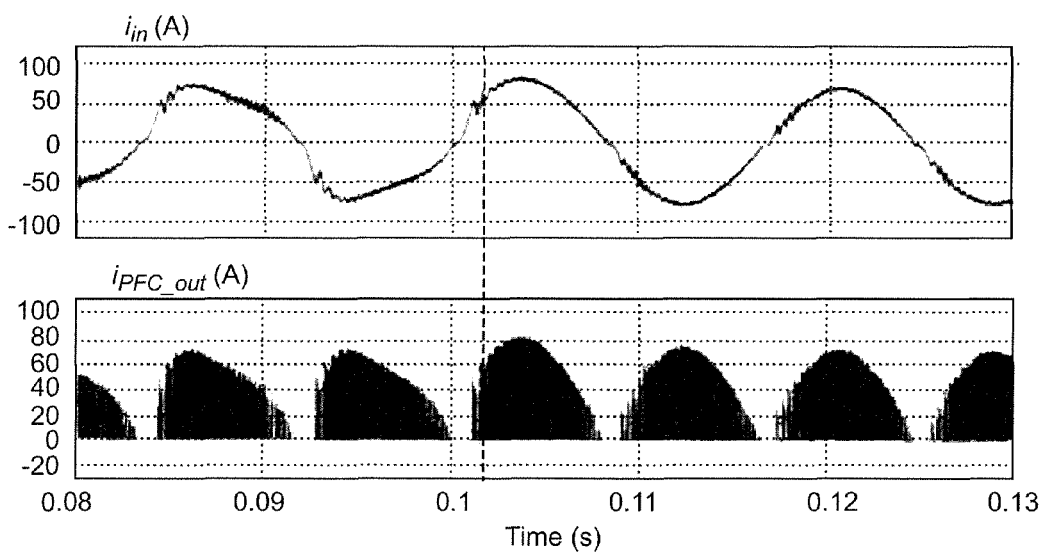
FIG. 5 illustrates waveforms of the PFC input current before and after onset of power storage in an inductor.

In FIG. 5, the waveforms of the PFC input current $i_{in}$ and PFC output current $i_{PFC\_out}$ with and without power storage in the inductor showing that the distortion due to the power ripple rapidly disappears when power is stored in the inductor. In FIG. 6, it can be seen that, without power storage in the inductor, the load (e.g. battery charging current) current oscillates by about a factor of two without energy storage in the inductor but becomes substantially constant, as is much preferred, when energy storage in the inductor is provided. The near-constant load current that is substantially devoid of second order power ripple allows the value of the filter/DC-bus capacitor to be reduced by an order of magnitude with comparable reduction in the required volume and weight. It can also be seen from FIG. 6 that the variation in current is transferred almost entirely from the load/battery to the inductor; establishing the efficacy of the invention. From FIG. 7 it can be seen that, at the second harmonic, the PFC output current and the filter/DC-bus capacitor current are substantially equal without energy storage in the inductor and that, with energy storage in the inductor, the second harmonic ripple current is transferred, substantially in its entirety after transients have subsided, from the capacitor to the inductor; reducing the ripple current in the capacitor.

In view of the foregoing, it is seen that the only additional hardware beyond that required in an electric-powered vehicle for normal operation is a circuit for generation of appropriate control signals for converter 120 to form series-parallel connections of the motor windings of the EV which can be made very small and light weight (e.g. a small portion of the control waveform generator for generating the waveforms for normal operation of the motor that alternatively provides the waveforms of FIG. 1A; both of which could be integrated on the same integrated circuit chip) to allow a much smaller and lighter filter/DC-bus capacitor to be used in the battery charger and to provide much improved power factor correction and reduction of noise reflected to the power source during battery charging operations. To retrofit the invention into an existing vehicle to achieve such improved performance, no more than connection of an additional control circuit (e.g. as an integrated circuit) for generation of the control waveforms of, for example, FIG. 1A would be required to allow substitution of a much smaller and lighter filter/DC-bus capacitor. The battery charger for an electric vehicle and the PFC circuit thereof can be provided at lower cost and which has improved performance in both effective and efficient battery charging and power factor correction over corresponding apparatus possible prior to the invention. The invention is not limited to applications to battery chargers for electric powered vehicles but can be applied to hybrid electric powered vehicles and any PFC circuit for any power converter in any type of device in which a substantial inductor exists or can be electrically established such as by using an inductance multiplier circuit with any inductance such as a transformer winding.

While the invention has been described in terms of a single preferred embodiment, those skilled in the art will recognize that the invention can be practiced with modification within the spirit and scope of the appended claims.

The invention claimed is:

1. A method of supplying power to a device, wherein said device includes an inductor, said method comprising steps of:
   supplying alternating current power to a power factor correction circuit having a rectifier,
   connecting an output of said power factor correction circuit to a power converter, said power converter causing low frequency second order power ripple at a second harmonic frequency of said alternating current power,
   connecting an output of said power converter to a load through a switching circuit, said load having a filter capacitor connected in parallel with said load, and
   connecting said inductor in parallel with said parallel connection of said filter capacitor and said load,
   whereby a portion of said low frequency, second order ripple power of said output of said power factor correction circuit and said power converter is stored in said inductor of said device and said ripple power stored in said filter capacitor is reduced.

2. The method as recited in claim 1, wherein said power converter is a boost converter.

3. The method as recited in claim 1, wherein said load is a battery, said method further comprising a steps of
   disconnecting said battery from said power converter and delivering power from said battery to said device through said switching circuit.

4. The method as recited in claim 3, wherein said battery supplies power to said device through said switching circuit.

5. The method as recited in claim 4, wherein said switching circuit is connected to and additionally controls an electric motor.

6. The method as recited in claim 5, wherein said device is an electric-powered vehicle having said electric motor and said inductor of said device includes a winding of said electric motor.

7. The method as recited in claim 6, wherein said inductor includes at least two windings of said electric motor.

8. The method as recited in claim 7, wherein said switching circuit is provided to control said electric motor including a further step of:
selectively connecting said converter to respective ones of said at least two windings through said switching circuit.

9. The method as recited in claim 8, including the further step of:
forming a series-parallel connection of windings of said electric motor using said switching circuit.

10. The method as recited in claim 8, wherein said step of selectively connecting said power converter to said respective windings periodically reverses current through said respective windings.

11. A controller for controlling a switching circuit for supplying power from a rechargeable battery to at least one winding of an electric motor to control normal operation of said motor, and providing signals to respective switches of said switching circuit such that said at least one winding of said electric motor is connected as a single phase inductor in parallel with said battery during charging of said battery from a rectified alternating current power source such that a portion of second order power ripple energy is stored in said winding rather than a filter capacitor while charging said battery and current through said at least one winding is periodically reversed such that magnetization of said winding is avoided during said charging of said battery.

12. A controller as recited in claim 11, wherein said switches of said switching circuit are electronic switches and said controller connects control electrodes of at least two of said electronic switches to be controlled in common.

13. A controller as recited in claim 11, wherein said electric motor is a multi-phase electric motor having at least two windings and said controller generates waveforms to control said switches to commutate connection as a single phase inductor of said at least two windings among phases of said multi-phase electric motor.

14. An electrically powered vehicle including an electric motor, a battery, a battery charger and a switching circuit for controlling connection of at least one winding of said motor to said battery for normal operation of said electrically powered vehicle wherein said battery charger includes a controller for generating signals to control said switching circuit such that said at least one winding is connected to said battery charger as an inductor in parallel with said battery for storing low frequency second order ripple power appearing at an output of a power factor correction circuit and power converter and periodically reversing a direction of current flow in said inductor.

15. An electrically powered vehicle as recited in claim 14, wherein said motor includes at least two windings and said controller controls at least two switches of said controller in common.

16. An electrically powered vehicle as recited in claim 15, wherein said controller commutates the connection of said windings as an inductor through all phases of a multi-phase electric motor.

* * * * *